UNITED STATES PATENT OFFICE.

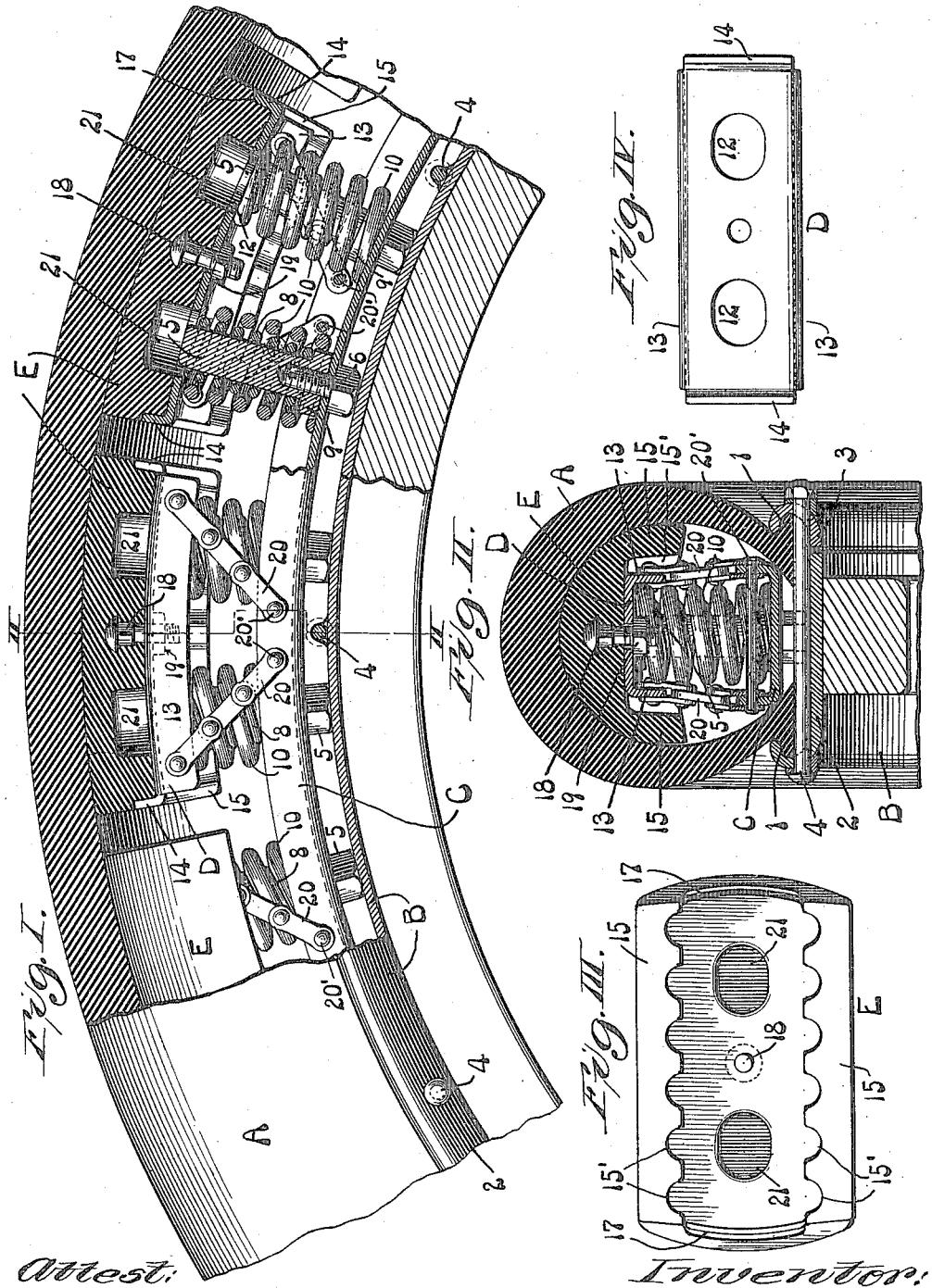

LAFAYETTE ELMER PICKETT, OF ST. LOUIS, MISSOURI.

RESILIENT TIRE.

1,143,994.  Specification of Letters Patent.  Patented June 22, 1915.

Application filed February 12, 1915. Serial No. 7,674.

*To all whom it may concern:*

Be it known that I, LAFAYETTE E. PICKETT, a citizen of the United States of America, a resident of the city of St. Louis, State of Missouri, have invented certain new and useful Improvements in Resilient Tires, of which the following is a full, clear, and exact description, reference being had to the accompanying drawing, forming a part of this specification.

My invention relates to a resilient tire and more particularly to a shock absorbing device adapted to be used in lieu of a pneumatic tube.

The object of the invention is to produce a very simple puncture proof shock absorbing device, having the required strength and resiliency.

The preferred form of my invention comprises a spring holder, a series of springs held thereby, a series of independently movable spring caps slidably fitted to said springs, and flexible connections uniting said spring caps to the spring holder. The springs are so held that the spring caps may partake of slight movements circumferentially of the tire without materially distorting the springs. The new structure also includes auxiliary cushions fitted to the outer faces of the spring caps and adapted to engage the tire casing. These auxiliary cushions are so combined with the tread portion of the outer casing that the tread of the tire is quite free to yield or bend in running over small objects, instead of bouncing in response to the impact against such objects. The yieldable rubber tread, associated with the soft auxiliary cushions, is well adapted to grip the roadway as a traction element, instead of slipping or skidding like the ordinary inflated tire.

The invention also includes certain specific details of construction which will be hereinafter described.

Figure I is a longitudinal section, partly in elevation, illustrating a fragment of a tire embodying the features of my invention. Fig. II is a transverse section taken approximately on the line II—II, Fig. I. Fig. III is a detail view of one of the auxiliary cushions. Fig. IV is a detail view of one of the spring caps.

My resilient tire preferably, but not essentially, includes an outer casing A of the clencher type, provided with the usual beads 1, and a sectional rim B, of the clencher type. The rim I have shown consists of ring sections 2 and 3, fitted to the tire beads 1 and connected together by means of transverse bolts 4 which lie between the casing and the rim. The inner face of the casing is preferably notched to receive the bolts 4 as shown most clearly in Fig. I.

C designates a circular spring holder arranged within the casing and provided with radial spring holding pins 5. These pins are rigidly secured to the web of the spring holder C by means of screws 6 passing through the spring holder and screwed into said pins 5. Each screw 6 has a head adapted to engage the rim B. It will be noted that the spring holder C is separated from the rim B so that the bolts 4 may be readily inserted between said parts. Each spring holding pin 5 is surrounded by an inner spring 8 resting on a flange 9 at the inner end of the pin, and an outer spring 10 which surrounds said flange.

D designates spring caps slidably fitted to the outer end of the radial springs, each spring cap being provided with a pair of elongated openings 12 adapted to receive the spring holding pins when the springs are compressed. Each spring cap is a sheet metal member having inturned flanges 13 at its sides, and outturned flanges 14 at its ends.

Arched rubber cushions E, seated on the outer faces of the spring caps, are provided with inturned marginal portions 15 which cover the side flanges 13 of the spring caps. These marginal portions 15 protect the rubber casing from the metallic spring caps, and they are preferably recessed at 15' to render the cushions more flexible at these points and also to economize by reducing the weight of the rubber. The outer faces of the rubber cushions conform to the configuration of the adjacent face of the tire, to which they are closely fitted as shown most clearly in Fig. II. The ends of the rubber cushions are recessed at 17 to receive the end flanges 14 of the spring caps, said flanges being interlocked with the cushions.

18 designates carriage bolts having their heads embedded in the rubber cushions and provided with threaded portions which extend through the spring caps. Nuts 19 are screwed onto the bolts 18 to secure the cushions to the spring caps. The bolts 18 are intended to serve as means for securing the cushions to the spring caps before the device is placed in the tire casing. When the tire is in service the cushions are retained in position by the flanges 14 at the ends of the spring caps. To prevent the cushions from being torn by the bolts 18, the latter are loosely fitted to the spring caps D, the holes through which the bolts pass being larger than the bolts.

The spring caps are restrained and guided in their movements by pairs of chains 20 arranged at opposite sides of the springs. The outer ends of the chains 20 are connected to the flanges 13 at points near the ends of the spring caps, and the inner ends of said chains are connected to the marginal flanges of the circular spring holding member C. The chains of each pair of chains 20 diverge from the spring holding member toward the ends of the spring cap to which they are secured. The connections are very strong and have the desired flexibility, permitting the spring caps to move toward the spring holder C, and serving as means for guiding the spring caps when the latter are restored by the pressure of the springs.

The chains 20 are preferably secured to the spring holder C by the long rivets 20', extending across the spring holder and passing through two of the chains, the ends of said rivets 20' being upset against the chains. These long rivets may be readily applied to the chains while the springs are held under compression, and since the ends of the rivets are exposed at the sides of the spring holder, they may be easily upset to produce the rivet heads.

The inner springs 8 are closely fitted to the spring holding pins 5 and the outer springs lie close to the inner ones, the object being to securely hold the springs by the rigid pins 5 so that the springs will not be materially distorted when the spring caps slide on the outer ends of the springs. Each rubber cushion E is provided with a pair of elongated openings 21 adapted to receive the outer ends of pins 5 when the springs are compressed. Under some conditions, when the vehicle is heavily loaded and the wheel is serving to drive the vehicle, the springs slide a slight distance on the inner faces of the spring caps, a movement of this kind being permitted by the flexible chains 20 and the rigid spring holding pins 5.

As previously suggested, the soft rubber cushions E permit the tread of the tire to yield or bend quite freely in running over small objects, instead of bouncing from the roadway, and the radial springs serve as very effective cushions for the vehicle. The rebound is not great, for the springs only move a slight distance and the thick mass of rubber between the springs and the outer face of the tire forms a very material part of the means for cushioning the shocks to which the wheel is subjected.

I claim:—

1. A tire filler comprising a spring holder having a series of spring holding pins, springs closely fitted to said pins, spring caps seated on the outer ends of said springs and flexibly connected to said spring holder, said spring caps being adapted to slide on the outer ends of said springs, and cushions fitted to the outer faces of said spring caps, said cushions and spring caps being provided with openings for the reception of said spring holding pins.

2. A resilient tire comprising a circular spring holder, radial springs seated on said spring holder, rigid spring caps slidably fitted to the outer ends of said springs, divergent chains connecting the sides of said rigid spring caps to said spring holder so as to permit said springs to slide on the inner faces of said rigid spring caps, said rigid spring caps having no direct connection with each other and each being free to play circumferentially of the tire independently of the other spring caps, and spring holding studs arranged with said springs and secured to said rim, the outer ends of said studs being normally located adjacent to the inner faces of said rigid spring caps and serving to securely hold said springs when they slide on the inner faces of said rigid springs caps.

LAFAYETTE ELMER PICKETT.

In the presence of—
E. K. CLARK,
A. J. McCAULEY.

Copies of this patent may be obtained for five cents each, by addressing the "Commissioner of Patents, Washington, D. C."